Aug. 18, 1931.  G. R. METCALF, JR  1,819,651
CONNECTER
Filed July 16, 1928
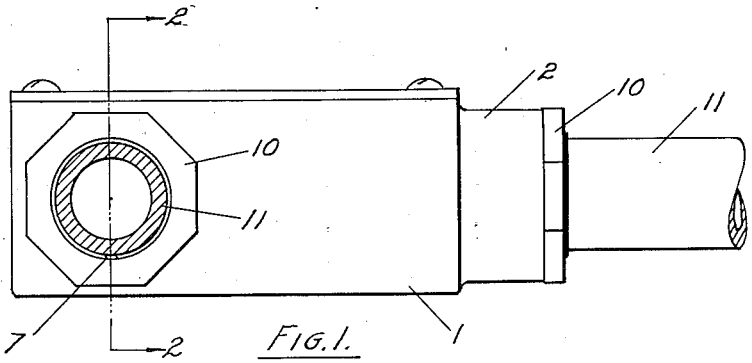
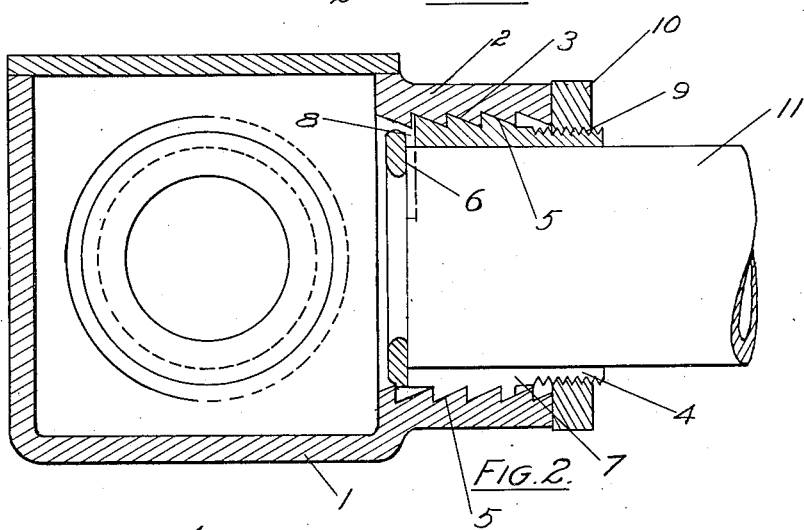
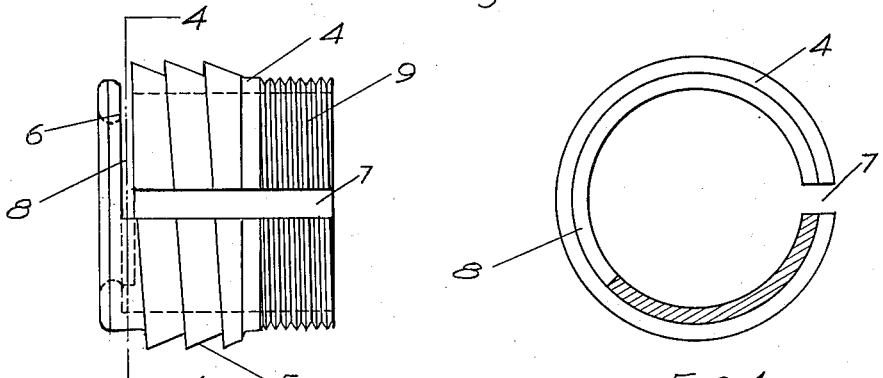
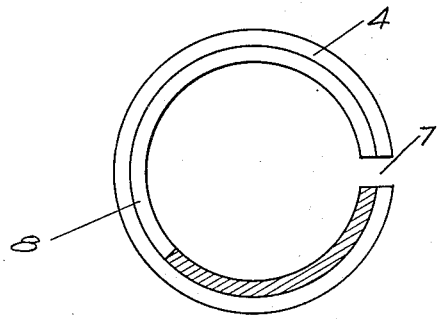
George R. Metcalf Jr.
INVENTOR
BY
ATTORNEYS.

Patented Aug. 18, 1931

1,819,651

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONNECTER

Application filed July 16, 1928. Serial No. 293,171.

The present invention is designed to connect two members and as exemplified in the drawings is adapted for connecting threadless conduits with conduit fittings. Heretofore connecters of this sort have been provided with wedging engaging surfaces but ordinarily these surfaces have been brought into engagement by an axial movement of the members in a direction from the large end of the wedging surface toward the small end. In a conduit fitting this has been accomplished by inserting a contractible sleeve from within the conduit. The present invention permits of the insertion of such sleeve from the outer end of the fitting. Features and details of the invention will appear from the specification and claims.

A preferred embodiment of the invention is illustrated in the accompanying drawings as follows:—

Fig. 1 shows a side elevation of a conduit fitting connected with a conduit.

Fig. 2 a section on the line 2—2 in Fig. 1.

Fig. 3 a detached elevation of a contractible sleeve.

Fig. 4 a section on the line 4—4 in Fig. 3.

1 marks a conduit box, and 2 an extension on the box in the form of a sleeve. The sleeve is provided with a series of inwardly faced wedging surfaces 3, these being preferably in the form of a buttress thread. A contractible sleeve 4 is provided with a thread 5 with the wedging surfaces facing outwardly. This sleeve is provided with a guard shoulder 6 at its inner end and has an axial slot 7 extending from its outer end to the guard shoulder and a circumferential slot 8 extending from the axial slot along the guard shoulder, the guard shoulder presenting a continuous lead surface.

The sleeve is provided with an ordinary screw thread 9 at its outer end and a nut 10 is arranged on this screw and engages the end of the sleeve 2. An inserted conduit 11 is shown in place within the sleeve 4.

With this structure the sleeve is readily insertable from the outside of the box by merely screwing it into the end of the sleeve. The nut 10 may be previously assembled on the threads 9. When the screw threads of the sleeve have advanced to a point bringing the nut 10 in engagement all that is necessary to contract the sleeve 4 is to screw up the nut 10. If there is a tendency initially for the threads 5 to advance under the pull of the nut 10 this will almost immediately cease because the frictional engagement of the tapered surfaces is greater than that of the threads 9. By screwing up the nut 10 the wedging surfaces of the threads 5 are drawn axially against the wedging surfaces of the threads 3, thus contracting the sleeve into clamping engagement with the conduit 11.

It will be noted that the engaging wedging surfaces of the sleeve 4 face outwardly and that as tensile strain is placed upon the conduit this tends to draw the engaging surfaces more firmly together and to increase the contracting effect of said surfaces on the sleeve so that as the strain upon the conduit increases the clamping action increases.

While I have shown the assembling of the sleeve as being accomplished by a screw thread it will be noted that such an engagement is accomplished by a relative axial and rotative movement of these sleeves and the insertion of the sleeve 4 may be accomplished from the outer end.

What I claim as new is:—

1. In a connecter, the combination of a body comprising a body sleeve provided with wedging surfaces; a removable sleeve having wedging surfaces faced outwardly engaging the wedging surfaces of the body sleeve, one of said sleeves being insertable into interlocking position with the other by a movement of the removable sleeve axially and rotatively relatively to the body sleeve, the axial movement being inwardly from the outer end of the body sleeve and one of said sleeves being axially slotted; and means forcing said removable sleeve outwardly to actuate the slotted sleeve radially.

2. In a connecter, the combination of a body sleeve provided with internal wedging surfaces; a removable sleeve having wedging surfaces facing outwardly engaging the wedging surfaces of the body sleeve, the removable sleeve being axially slotted and insertable into the body sleeve from the outer end of the body sleeve; and means forcing said removable sleeve outwardly to contract the same through the action of the wedging surfaces.

3. In a connecter, the combination of a body sleeve provided with internal wedging surfaces; a removable sleeve having wedging surfaces facing outwardly engaging the wedging surfaces of the body sleeve, the removable sleeve being axially slotted and insertable into the body sleeve from the outer end of the body sleeve; and means forcing said removable sleeve outwardly to contract the same through the action of the wedging surfaces comprising a screw thread at the outer end of the removable sleeve and a nut on the screw thread.

4. A connecter comprising two sleeves, one of which is slotted axially, said sleeves having screw threads with wedging engaging surfaces; and means forcing the sleeves axially relatively to actuate the slotted sleeve radially through the wedging action of the wedging surfaces of the threads.

5. A connecter comprising two sleeves, one of which is slotted axially, said sleeves having screw threads with wedging engaging surfaces; and means forcing the sleeves axially relatively to actuate the slotted sleeve radially through the wedging action of the wedging surfaces of the threads, comprising a screw-threaded nut acting on one of the sleeves.

6. In a connecter, the combination of a body sleeve provided with internal wedging surfaces; a removable sleeve having wedging surfaces facing outwardly engaging the wedging surfaces of the body sleeve, the removable sleeve being axially slotted and insertable into the body sleeve from the outer end of the body sleeve; and means forcing said removable sleeve outwardly to contract the same through the action of the wedging surfaces, comprising a screw-threaded nut acting on one of the sleeves.

7. A connecter comprising two sleeves, one of which is slotted axially, said sleeves having screw threads with wedging engaging surfaces; and means forcing the sleeves axially relatively to actuate the slotted sleeve radially through the wedging action of the wedging surfaces, said means comprising a second thread on one of the sleeves and a nut on said last-mentioned thread.

8. A connecter comprising two sleeves, one of which is slotted axially, said sleeves having screw threads with wedging engaging surfaces; and means forcing the sleeves axially relatively to actuate the slotted sleeve radially through the wedging action of the wedging surfaces, said means comprising a second thread on the slotted sleeve and a nut on said last-mentioned thread.

9. A connecter comprising a body sleeve and a removable sleeve, one of which is slotted axially, said sleeves having screw threads with wedging engaging surfaces, the wedging surfaces of the removable sleeve facing outwardly; and means forcing the sleeves axially to actuate the slotted sleeve radially through the action of the wedging surfaces of the thread.

10. A connector comprising a body sleeve and a removable sleeve, one of which is slotted axially, said sleeves having screw threads with wedging engaging surfaces, the wedging surfaces of the removable sleeve facing outwardly; and means forcing the sleeves relatively axially to actuate the slotted sleeve radially through the action of the wedging surfaces of the thread, said means comprising a screw-threaded nut acting on one of the sleeves.

11. A connecter comprising a body sleeve and a removable sleeve, one of which is slotted axially, said sleeves having screw threads with wedging engaging surfaces, the wedging surfaces of the removable sleeve facing outwardly; and means forcing the sleeves axially to actuate the slotted sleeve radially through the action of the wedging surfaces of the thread, said means comprising a second thread on the removable sleeve and a nut on said last-mentioned thread.

12. In a connecter, the combination of a body sleeve having screw threads with inclined wedging surfaces facing inwardly; a removable slotted sleeve within the body sleeve having inclined screw threads facing outwardly; and means forcing said slotted sleeve axially outwardly.

13. In a connecter, the combination of a body sleeve having screw threads with inclined wedging surfaces facing inwardly; a removable slotted sleeve within the body sleeve having inclined screw threads facing outwardly; and means forcing said slotted sleeve axially outwardly comprising a threaded nut actuating said slotted sleeve.

14. In a connecter, the combination of a body sleeve having screw threads with inclined wedging surfaces facing inwardly; a removable slotted sleeve within the body sleeve having inclined screw threads facing outwardly; and means forcing said slotted sleeve axially outwardly comprising a second thread on the slotted sleeve and a nut on said second thread.

15. A connecter comprising two sleeves, one of which is slotted axially, said sleeves having buttress screw threads forming wedging engaging surfaces; and means forcing the sleeves axially relatively to actuate the slotted sleeve radially through the wedging action of the wedging surfaces of the sleeves.

16. A connecter comprising two sleeves, one of which is slotted axially, said sleeves having buttress screw threads forming wedging engaging surfaces; and means forcing the sleeves axially relatively to actuate the slotted sleeve radially through the wedging action of the wedging surfaces of the sleeves, said means comprising a threaded nut acting on one of the sleeves.

17. A connecter comprising two sleeves, one of which is slotted axially, said sleeves having buttress screw threads forming wedging engaging surfaces; and means forcing the sleeves axially relatively to actuate the slotted sleeve radially through the wedging action of the wedging surfaces of the sleeves, said means comprising a second thread on one of the sleeves and a nut operating on said second thread.

18. In a connecter, the combination of a body sleeve having a buttress thread with inclined surfaces facing inwardly; a slotted sleeve within the body sleeve having a buttress thread with inclined surfaces facing outwardly; and means forcing the slotted sleeve axially outwardly.

19. In a connecter, the combination of a body sleeve having a buttress thread with inclined surfaces facing inwardly; a slotted sleeve within the body sleeve having a buttress thread with inclined surfaces facing outwardly; and means forcing the slotted sleeve axially outwardly comprising a nut on the slotted sleeve.

In testimony where I have hereunto set my hand.

GEORGE R. METCALF, Jr.